United States Patent Office 3,118,908
Patented Jan. 21, 1964

3,118,908
PROCESS FOR EXTRACTING GIBBERELLINS
FROM FERMENTATION LIQUIDS
Louis Roux, Le-Mesnil-Saint-Denis, Seine-et-Oise, France, assignor to Societe d'Etudes et d'Applications Biochimiques, Jouy-en-Josas, France, a French company
No Drawing. Filed Oct. 30, 1961, Ser. No. 148,691
Claims priority, application France Nov. 2, 1960
6 Claims. (Cl. 260—343.3)

This invention relates to a process for extracting gibberellins from the fermentation medium in which they are formed in very low concentraitons and is based on the discovery that it is possible to selectively adsorb and concentrate gibberellins on a weak anion exchange resin when the fermentation medium has been sufficiently purified to remove the inorganic and organic acid impurities. The invention provides an improved process for producing an aqueous concentrate of fermentation-derived gibberellins relatively free from impurities.

The process for extracting and purifying gibberellins have varied but little since the first research on these unique metabolites was conducted during the years preceding World War II. The extraction method which was initially used by the Japanese investigators who isolated gibberellins from a fermentation medium of *Gibberella fujikuroi* was based on adsorbing the gibberellins contained in the culture medium onto activated carbon, and then eluting the metabolite from the adsorbant by contacting it with a water-miscible solvent such as acetone or methanol, to which could be added ammonia. However, the manipulation of the large amounts of solvent which is required by this operation, coupled with the necessity of recovering the solvent values, militate against the industrial application of this previously known process.

Until now the extraction of gibberellins from fermentation liquids by ion exchange resins has been of academic interest only, primarily because of the inherent difficulties in handling the gibberellins and the culture media in which they are dissolved. The culture media generally contain organic acids and many other impurities which are preferentially adsorbed onto an anion exchange resin together with the gibberellins, thereby necessitating the use of an excessive amount of resin and rendering the treatment of large volumes of fermentation media rather impractical. Moreover, the gibberellins are difficult to elute with an aqueous solvent from strong anion exchange resins, and consequently the eluate is quite diluted and the elution of gibberellins incomplete. Even when the gibberellins are eluted from the anion exchange resin on which they are adsorbed with a water-miscible solvent containing a buffering agent, the difficulties encountered are the same as if the gibberellins were eluted from activated carbon with organic solvents.

According to the present invention instead, the fermentation medium containing minute amounts of gibberellins is initially purified by treating it with a basic alkaline earth compound to precipitate substantially all of the inorganic and organic acid impuriites (leaving the gibberellins in solution). It is then possible to remove any excess alkaline earth compound by adsorbing it onto a weak cation exchange resin without affecting the dissolved gibberellins, and then to selectively adsorb the gibberellins onto a weak anion exchange resin from which these metabolites may be eluted by an aqueous solvent, preferably containing ammonia or an ammonium salt, having a pH of at least 7.0. The resultant aqueous eluate contains the gibberellins in solution and is sufficiently concentrated for recovery of the gibberellins or for immediate use, without further purification, in various agricultural products in which gibberellins have been found to be effective. Moreover, from this eluate there may be obtained, after purification, crystallized gibberellins of any desired purity.

Based on these discoveries, the invention provides an improved process for extracting gibberellins from the fermentation medium in which they are formed in minute quantities which comprises (*a*) treating the gibberellin-containing fermentation liquid with a sufficient quantity of a basic alkaline earth compound to precipitate substantially all of the inorganic and organic acid impurities from the fermentation liquid while leaving the gibberellins dissolved in solution, (*b*) contacting the treated fermentation liquid with a weak cation exchange resin to decrease the pH of the fermentation liquid to about 4.5 and thereby remove substantially all of any excess of the alkaline earth compound remaining in solution, (*c*) contacting the resultant fermentation liquid with a weak anion exchange resin to selectively adsorb the gibberellins onto the anion exchange resin and extract them from the treated fermentation liquid, (*d*) treating the anion exchange resin containing the adsorbed gibberellins with an aqueous solution having a pH of at least 7.0 to elute the adsorbed gibberellins from the anion exchange resin and thereby dissolve them in the eluate, and (*e*) recovering the resultant eluate.

Although any basic alkaline earth compound may be used to precipitate the inorganic and organic acid impurities from the gibberellin-containing fermentation liquid, I have obtained particularly satisfactory results using barium oxide. Purification of the fermentation medium with barium oxide effectively eliminates (by precipitation) all of the phosphates, sulfates, tartrates, citrates, coloring matter, as well as proteinaceous and other undetermined impurities, without co-precipitation of the gibberellins from the fermentation liquor.

The amount of barium oxide which is necessary to precipitate the inorganic and organic acid impurities from the fermentation medium depends upon its acid number, but generally ranges between 3 to 5 grams of hydrated barium oxide per litre of culture medium.

My investigations have also shown that the gibberellins adsorb easily on weak anion exchange resins, particularly type IR–4B resins, but owing to the coefficient of separation of the various anions, the amount of gibberellins adsorbed onto the resin without elution during percolation on a column (and hence without loss in the effluent) depends on the form of the anion. For example, an anion exchange resin in the form of its acetate can adsorb up to 150 milligrams of gibberellins per millilitre of the resin, while the same resin used as its formate can adsorb from 120 to 130 milligrams; on the other hand, if the resin is employed as its chloride, the gibberellins start passing into the effluent after only 30 milligrams of gibberellins have been adsorbed per millilitre of resin.

To avoid the losses of gibberellins from solution, the extraction from culture media, even when it has been purified as previously indicated, requires much larger quantities of resin than would be required were the gibberellins recovered from a pure aqueous solution. When the anion exchange resin is used in the form of its acetate, however, it is sufficient for one litre of medium to use about 15 millilitres of the IR–4B resin (provided the medium has been purified by precipitation of the inorganic and organic acid impurities); by way of contrast, using an unpurified medium and the anion resin in its chloride form results in massive losses of gibberellins, even with resin amounts of 100 ml. per litre of medium.

During the elution by ammonia, owing to the exchange which occurs all along the column, an important fraction of the eluate discharges at a pH near 5, which corresponds to the complete alkali neutralization of acids having a pK near 3.8 and which contains the largest fraction of the gibberellins. Following this fraction, the effluent pH rises up progressively, primarily because the eluate contains substances of higher pK (certain gibberellins and impurities), and because the percolated ammonia and the eluating portions are intermixed within the column of the resin, so that the last effluent portions are definitely alkaline. My experiments have shown that the first fractions coming out with an acid pH contain less impurities than the last neutral and alkaline fractions.

These latter alkaline fractions are more colored in appearance and less pure than the preceding fractions. To reduce their volume, and hence increase the volume of the preceding (and purer fractions) I have found that if elution is realized slowly enough by regulating the flowing out at a rate not over 0.25 millilitre per square centimetre of column per minute, it is possible to concentrate more of the gibberellins in the initial (acidic) fractions. Under these conditions, the operation is substantially completed when the obtained eluate volume is from 2 to 2.5 times the volume of the anion exchange resin. This eluate volume will contain more than 90% by weight of the gibberellins initially present in the culture medium.

According to the concentration of gibberellins in the medium, the eluate may contain between 8 and 15 grams of gibberellins per litre and, if it has been separated into fractions, the more concentrated fractions may even contain up to 25 grams of gibberellins per litre.

To reduce the eluate volume by as much as one-third, I have found that it is practicable to add about 1% by weight of a nonionic surfactant, such as sorbitan monolaurate ("Tween 20") to the ammoniacal eluate, the surfactant facilitates the exchanges which occur inside the resin grains, thereby allowing a more efficient elution to occur and precluding the retention of the gibberellins on the column. In this manner, the entire eluate, corresponding to about 90% by weight of the gibberellins contained in the medium, may be obtained in a volume which is from 1.5 to 2 times that of the anion exchange resin. The gibberellins contained in the eluate are frequently concentrated from 25 to 40 times higher than in the fermentation liquid.

If the eluate is to be used directly for the preparation of a solution intended for agriculture, all the fractions may be intermixed, and the mixture should be acidified up to pH 6 to avoid the degradation which is likely to occur after the gibberellins remain for a time in a basic solution. On the other hand, if the gibberellins are to be crystallized, it may be more advantageous to employ only the first fractions coming out at a pH between 5 and 7, which fractions are purer than the succeeding fractions.

When the eluate is an aqueous solution of an ammonium salt, such as ammonium diphosphate, buffered to a pH of 7 by the addition of phosphoric acid, the pH of the effluent containing the eluted gibberellins is maintained at 7.5 for a long period, and never exceeds 8.5 even at the end of the elution. Moreover, the eluate is less colored and contains sufficiently fewer impurities so that the eluate may be used directly after subsequent acidification, to extract the gibberellins by ethyl acetate. Evaporation of the ethyl acetate solution yields raw crystalline gibberellins, which may be used as such for industrial or agricultural prepartions.

The following examples are illustrative of the ease with which gibberellins may be concentrated and recovered from fermentation liquors in accordance with the invention:

*Example I*

Extraction from 10 litres of culture medium containing 226 mg. gibberellins per litre. The following operations were performed:

(1) An aqueous solution (400 ml.) of 4% barium oxide was added to the culture medium, and the solution stirred, let stand for 5 minutes, and then filtrated.

The filtrate was transparent, almost colorless, and slightly alkaline, having a pH of 8.5. The precipitate was washed with 200 ml. of water, and the wash waters then added to the filtrate.

(2) The combined filtrate was rapidly passed onto a weak cation exchanging column, Type IRC–50 (in its protonated form), the dimensions of the column being 4 cm. in diameter, and 20 cm. in length, with a volume of about 200 ml.

At the end of this operation, the column was washed with 200 ml. of water which was added to the rest of the effluent.

(3) The purified fermentation liquid was then treated with a weak anion exchange resin (Type IR–4B), the resin being in the form of its formate (i.e. treated with 1 N formic acid and washed with water to pH 4). The dimensions of the column were as follows, 3 cm. in diameter, 7 square cm. in cross-section, 22 cm. in height, and a volume of about 150 ml. The flow rate of the fermentation medium was 2 ml./cm.$^2$/minute, which equalled about 900 ml. per hour. The operation lasted 12 hours.

(4) The gibberellins were eluted from the anion exchange resin with 1 N ammonia, using a flow rate of 0.2 ml./cm.$^2$/minute, the operation lasting 4 hours.

The gibberellins began to come out of the column after the passage of 75 ml. of eluate. Three fractions were collected according to the following table:

| Fraction | pH | Volume, ml. | Concentration in pure Gibberellins, mg/ml. | Weight of pure Gibberellins, mg. | Purity of raw ethyl acetate extract, percent |
|---|---|---|---|---|---|
| I | up to 6.5 | 150 | 3.85 | 580 | 78 |
| II | 6.5 to 8 | 56 | 11.5 | 645 | 71.7 |
| III | alkaline pH =pH 9. | 100 | 12.3 | 1,230 | 51.5 |

The total volume of the eluate was twice that of the column.

The yield was approximately 100% (the amount of the recovered gibberellins was slightly above that of the gibberellins determined in the medium: 2455 to 2260 mg.). This difference was due to the fact that the approximation of the gibberellins contained in the culture medium is based on an extraction on carbon, the yield of which is not absolutely quantitative.

*Example II*

Extraction from 100 litres to culture medium, containing 420 mg. of gibberellins per litre, turbid looking, reddish, having a pH near 4. The following operations were performed:

(1) After a pre-trial, 5 litres of an aqueous solution of barium oxide were added to the culture medium, the solution stirred, allowed to stand for 10 minutes, and then filtrated on a Büchner funnel, using very low pressure (10 cm.), yielding 102 litres of a limpid, light yellow filtrate with a pH of about 8, which was combined with 5 litres of wash waters.

(2) Passage of the purified medium onto a weak cation exchange column (Type IRC–50 form H, the resin being regenerated by HCl and washed with 5 volumes of water).

The dimensions of this column were 10 cm. in diameter, 32 cm. resin height, and about 2,500 litres of resin volume. The flow rate was about 1 litre/minute. To save time, the filtrate was passed onto the column as it came out of the Büchner funnel, so that both operations were performed simultaneously, the first effluent coming out at pH 3, and the last at a pH of about 6. The total effluent when mixed together was at pH 4.5, and was limpid and almost colorless. The resin was washed with 2 litres of water, which was added to the effluent.

(3) The extraction was carried out on an acetate column (Type IR-4B, resin being treated with 1 N acetic acid). After setting up of the column, one litre of 1 N acetic acid was passed onto it, the resin washed with about 15 litres of deionized water, or until the pH of the wash water reached 4.

The dimensions of the column were: diameter 8 cm., resin height about 30 cm., resin volume 1.500 litres. The flowing rate was 3 ml./cm.$^2$/minutes, that is 150 ml. minutes or 9 litres per hour. The operation lasted 14 hours.

(4) Elution: The gibberellins were eluted from the column with ammonia (1 N and containing 1% of sorbitan monolaurate); flowing rate: 0.2 ml./cm.$^2$/minute= 600 ml./hour; duration of the operation: 6 hours.

The gibberellins began to come out after the passage of 1.200 litres, 2.8 litres were collected in two fractions:
(a) One fraction of pH<7 amounting to 1.500 litres.
(b) One fraction of pH>7 amounting to 1.300 litres.

The alkaline fraction was neutralized by HCl (6 N) poured drop by drop while stirring. Then both fractions were mixed, the final volume being 2.900 litres and the pH near 6.

The concentration of the gibberellins in the whole of the eluate was 13.850 g. per litre, that is a total of 38.800 g.

The culture medium contained 420×100=42.000 g.
Thus the output was 38.8/42=92.5%.

Example III

Ten litres of culture medium, containing 450 mg. of gibberellins per litre, were purified by barium oxide and percolated on a weak cation exchange resin, according to the process described hereinbefore. The medium purified in this way was then percolated onto a column of weak anion exchange resin, such as Type IR-4B in the form of its acetate. The dimensions of the column were as follows: diameter 3.5 cm., section 9.6 cm.$^2$, resin height 19 cm., volume about 180 ml. The flow rate of the medium was 1.5 litre per hour; the operation lasted a little more than 7 hours.

The column was then washed with 200 ml. of water, following which the elution was performed.

The buffer used for this purpose was an approximately molar solution of di-ammonium phosphate (132 g. per litre). This solution was brought to a pH value of 7 by the addition of 7.5 ml. per litre of pure phosphoric acid (density 1.71). The flowing rate was 1.5 ml./minute; the operation lasted about 7 hours.

The first 80 ml. of effluent, which did not contain gibberellins, was rejected. Later fractions then began to come out and were collected in portions of 100 ml.

By means of a rapid fluorescence test, it was established that the most concentrated fractions were the two first portions, the richness in gibberellins then diminishing to become very low at the end of the 4th portion. Altogether, five portions were collected, corresponding to a total of 500 ml. of eluate. The pH values of these 5 fractions were respectively: 6.8—7—7.5—7.8—8.2. After they were all mixed together, the pH value of the whole was near 7.5.

The liquid was then acidified up to pH 3, by pouring onto it, drop by drop and whilst stirring, hydrochloric acid diluted to 5 N. The whole was twice extracted, each time by one volume of ethyl acetate. The solvent was evaporated until dry condition under reduced pressure and the evaporation residue was subsequently redissolved in 7 ml. of ethyl acetate under slight heat.

The solution was then poured in a pyrex basin and crystallization was provoked by rubbing the inside of the basin with a glass stick. Very quickly, the liquid became milky, permitting the deposit of very fine crystals.

After complete drying, there was obtained a light yellow powder consisting of very fine crystals, the total weight being 5.225 mg. The raw crystals contained 77% of gibberellins, and thus represented a total yield of 4.017 mg., or 89.2% of theory, based on the amount contained in the fermentation liquid.

I claim:
1. A process for extracting gibberellins from the fermentation medium in which they are formed in minute quantities which comprises (a) treating the gibberellin-containing fermentation liquid with a sufficient quantity of a basic alkaline earth compound to precipitate inorganic and organic acid impurities from the fermentation liquid while leaving the gibberellins dissolved in solution, (b) contacting the treated fermentation liquid with a weakly acidic polymeric cation exchange carboxylic resin to remove substantially all of any excess of the alkaline earth compound remaining in solution and to decrease the pH of the fementation liquid to between about 3 to about 5, (c) contacting the resultant fermentation liquid with a weakly basic polymeric anion exchange polyamine resin to selectively adsorb the gibberellins onto the anion exchange resin and extract them from the treated fermentation liquid, (d) treating the anion exchange resin containing the adsorbed gibberellins with an aqueous ammoniacal eluant having a pH between 7 and 9 to elute the adsorbed gibberellins from the anion exchange resin and thereby dissolve them in the eluate, and (e) recovering the resultant eluate.

2. A process for extracting gibberellins from the fermentation medium in which they are formed in minute quantities which comprises (a) treating the gibberellin-containing fermentation liquid with a sufficient quantity of barium oxide to precipitate substantially all of the inorganic and organic acid impurities from the fermentation liquid while leaving the gibberellins dissolved in solution, (b) contacting the treated fermentation liquid with a weakly acidic polymeric exchange cation resin to remove substantially all of any excess of the barium oxide remaining in solution and to decrease the pH of the fermentation liquid to between about 3 to about 5, (c) contacting the resultant fermentation liquid with a weakly basic polymeric anion exchange polyamine resin to selectively adsorb the gibberellins onto the anion exchange resin and extract them from the treated fermentation liquid, (d) treating the anion exchange resin containing the adsorbed gibberellins with an aqueous ammoniacal eluant having a pH between 7 and 9 to elute the adsorbed gibberellins from the anion exchange resin and thereby dissolve them in the eluate, and (e) recovering the resultant eluate.

3. A process for extracting gibberellins from the fermentation medium in which they are formed in minute quantities which comprises (a) treating the gibberellin-containing fermentation liquid with a sufficient quantity of barium oxide to precipitate substantially all of the inorganic and organic acid impurities from the fermentation liquid while leaving the gibberellins dissolved in solution, (b) contacting the treated fermentation liquid with a weakly acidic polymeric cation exchange carboxylic resin in the protonated form to remove substantially all of any excess of the barium oxide remaining in solution and to decrease the pH of the fermentation liquid to between about 3 to about 5, (c) contacting the resultant fermentation liquid with a weakly basic polymeric anion exchange polyamine resin in which the anion is selected from the group consisting of acetate and formate to selectively adsorb the gibberellins onto the anion exchange resin and extract them from the treated fermentation liquid, (d) treating the anion exchange resin containing the adsorbed gibberellins with an aqueous ammoniacal eluate having a pH between 7 and 9 to elute the adsorbed gibberellins from the anion exchange resin and thereby dissolve them in the eluate, and (e) recovering the resultant eluate.

4. A process for extracting gibberellins from the fermentation medium in which they are formed in minute quantities which comprises (a) treating the gibberellin-containing fermentation liquid with a sufficient quantity of barium oxide to precipitate substantially all of the inorganic and organic acid impurities from the fermentation liquid while leaving the gibberellins dissolved in solution, (b) contacting the treated fermentation liquid with a weakly acidic polymeric cation exchange carboxylic resin in the protonated form to remove substantially all of any excess of barium oxide remaining in solution and to decrease the pH of the fermentation liquid to between about 3 to about 5, (c) contacting the resultant fermentation liquid with a weakly basic polymeric anion exchange polyamine resin in which the anion is selected from the group consisting of acetate and formate to selectively adsorb the gibberellins onto the anion exchange resin and extract them from the treated fermentation liquid, (d) treating the anion exchange resin containing the adsorbed gibberellins with an aqueous solution of ammonium phosphate buffered to a pH of 7.0 to elute the adsorbed gibberellins from the anion exchange resin and thereby dissolve them in the eluate, and (e) recovering the resultant eluate.

5. A process for extracting gibberellins from the fermentation medium in which they are formed in minute quantities which comprises (a) treating the gibberellin-containing fermentation liquid with a sufficient quantity of barium oxide to precipitate substantially all of the inorganic and organic acid impurities from the fermentation liquid while leaving the gibberellins dissolved in solution, (b) contacting the treated fermentation liquid with a weakly acidic polymeric cation exchange carboxylic resin in the protonated form to remove substantially all of any excess of the barium oxide remaining in solution and to decrease the pH of the fermentation liquid to between about 3 to about 5, (c) contacting the resultant fermentation liquid with a weakly basic polymeric anion exchange polyamine resin in which the anion is selected from the group consisting of acetate and formate to selectively adsorb the gibberellins onto the anion exchange resin and extract them from the treated fermentation liquid, (d) treating the anion exchange resin containing the adsorbed gibberellins with from about 2 to about 2.5 times its volume of an aqueous solution of ammonia to elute the adsorbed gibberellins from the anionic exchange resin and thereby dissolve them in the eluate, and (e) recovering the resultant eluate.

6. A process for extracting gibberellins in accordance with claim 5, characterized in that the aqueous solution of ammonia used to elute the adsorbed gibberellins from the anion exchange resin contains about 1 percent by weight of a nonionic surfactant.

References Cited in the file of this patent

Berggren et al.: Acta Chemica Scand., volume 12 (1958), pages 1521–1527.